United States Patent
Gupta et al.

(10) Patent No.: US 9,913,249 B2
(45) Date of Patent: Mar. 6, 2018

(54) METHOD AND SYSTEM FOR SELECTIVE PAGING OF WIRELESS DEVICES USING A CELLULAR BROADCAST SERVICE

(71) Applicant: AT&T INTELLECTUAL PROPERTY I, LP, Atlanta, GA (US)

(72) Inventors: Gaurav Gupta, Sammamish, WA (US); Rajendra Prasad Kodaypak, Sammamish, WA (US); Vivek Mhatre, Bellevue, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 14 days.

(21) Appl. No.: 14/963,468

(22) Filed: Dec. 9, 2015

(65) Prior Publication Data

US 2017/0171836 A1   Jun. 15, 2017

(51) Int. Cl.
*H04W 68/02* (2009.01)
*H04W 64/00* (2009.01)
*H04W 4/06* (2009.01)

(52) U.S. Cl.
CPC ............ *H04W 68/02* (2013.01); *H04W 4/06* (2013.01); *H04W 64/003* (2013.01)

(58) Field of Classification Search
CPC ..... H04W 4/06; H04W 76/002; H04W 68/00; H04W 68/02; H04W 68/04; H04W 4/02;
(Continued)

(56) References Cited

U.S. PATENT DOCUMENTS 5,533,094 A   7/1996  Sanmugam
5,590,398 A   12/1996 Matthews
(Continued)

FOREIGN PATENT DOCUMENTS

WO   9859516 A1   12/1998
WO   9944376 A1   9/1999

OTHER PUBLICATIONS

Akyildiz, Ian F. et al., "Movement-based location update and selective paging for PCS networks", IEEE/ACM Transactions on Networking {TON) 4.4 (1996): 629-638.
(Continued)

*Primary Examiner* — George Eng
*Assistant Examiner* — Umair Ahsan
(74) *Attorney, Agent, or Firm* — Guntin & Gust, PLC; Hay Anderson

(57) ABSTRACT

Aspects of the subject disclosure may include, for example, determining a request to transfer data to a group of wireless communication devices within an area. Wireless base stations of a wireless mobility network are identified, responsive to the request, wherein the wireless base stations provide wireless communication services within the area, including a Multimedia Broadcast Multicast Service (MBMS) service. A wireless transmission is facilitated of a first broadcast message by the wireless base stations, wherein the first broadcast message identifies the group of wireless communication devices. The broadcast message is transmitted by way of the MBMS service of the wireless communication services. The first broadcast message initiates a state transition to an active state for a plurality of wireless communication devices of the group of wireless communication devices configured in an idle state. Other embodiments are disclosed.

20 Claims, 6 Drawing Sheets

(58) Field of Classification Search
CPC ....... H04W 4/22; H04W 84/002; H04W 8/18; H04W 4/12; G08B 25/016; H04M 11/022; G06Q 30/02; G06Q 30/00; H04L 12/5895; H04L 12/5865; H04L 12/5845; H04L 12/58; H04L 12/5825
See application file for complete search history.

(56) References Cited

U.S. PATENT DOCUMENTS

| | | | |
|---|---|---|---|
| 5,732,357 | A | 3/1998 | Gayton et al. |
| 5,907,810 | A | 5/1999 | Subramanian et al. |
| 5,924,042 | A | 7/1999 | Sakamoto et al. |
| 6,023,624 | A | 2/2000 | Hanson |
| RE39,870 | E | 10/2007 | Mardirossian |
| 7,778,653 | B2 | 8/2010 | Narasimha et al. |
| 8,472,983 | B1 | 6/2013 | Kapoor et al. |
| 8,861,535 | B2 | 10/2014 | Marks et al. |
| 8,892,095 | B2 | 11/2014 | Wehmeier et al. |
| 8,897,819 | B2 | 11/2014 | Mihály et al. |
| 8,938,266 | B1 | 1/2015 | Singh et al. |
| 8,977,301 | B2 | 3/2015 | Strandberg et al. |
| 9,107,047 | B1 | 8/2015 | Malreddy et al. |
| 2006/0167944 | A1 | 7/2006 | Baker et al. |
| 2008/0119209 | A1 | 5/2008 | Upp et al. |
| 2009/0239555 | A1* | 9/2009 | Sim .................. H04W 8/186 455/458 |
| 2010/0061354 | A1* | 3/2010 | Maheshwari ......... H04W 68/02 370/338 |
| 2010/0124223 | A1 | 5/2010 | Gibbs et al. |
| 2010/0173651 | A1* | 7/2010 | Park ..................... H04W 68/02 455/458 |
| 2012/0163437 | A1* | 6/2012 | Frederiksen ........... H04L 5/001 375/224 |
| 2012/0202543 | A1* | 8/2012 | Murias ................. H04W 4/005 455/509 |
| 2013/0155954 | A1* | 6/2013 | Wang ................... H04W 4/005 370/328 |
| 2014/0022995 | A1 | 1/2014 | Park et al. |
| 2016/0374050 | A1* | 12/2016 | Prasad .................... H04W 4/06 |

OTHER PUBLICATIONS

Batayneh, Fahd A., "Location Management in Wireless Data Networks", Washington Univ., cs.wustl.edu, (2006).

Hartung, Frank. Et al., MBMS-IP Multicast/Broadcast in 3G Networks, International Journal of Digital Multimedia Broadcasting, vol. 2009, Article ID 597848, 25 pages, Mar. 1, 2009.

Imielinski, Tomasz et al., "GPS-based geographic addressing, routing, and resource discovery", Communications of the ACM 42.4 (1999).

Vegni, Anna Maria et al., "SRB: A Selective Reliable Broadcast protocol for safety applications in VANETs", Mobile and Wireless Networking (iCOST), 2012 International Conference on Selected Topics in. IEEE, 2012.

Wang, J. et al., "Trial results of intelligent paging in GERAN", Communications Letters, IEEE 11.10 (2007): 829-831.

* cited by examiner

200

300

METHOD AND SYSTEM FOR SELECTIVE PAGING OF WIRELESS DEVICES USING A CELLULAR BROADCAST SERVICE

FIELD OF THE DISCLOSURE

The subject disclosure relates to a method and system for selective paging of wireless devices using a cellular broadcast service.

BACKGROUND

A Long Term Evolution (LTE) capable, mobile communication device establishes connections and receives high-speed mobility services by a process that includes attachment to a Mobility Management Entity (MME) of an Evolved Packet Core (EPC) portion of a wireless mobility network. In a Connected state, the mobile device sends and/or receives data by way of a radio bearer established through a base station of the mobility network. While not engaged in an active exchange of data packets, the mobile device generally reverts to an idle state. Namely, the mobile device is released when an inactivity timer has been exceeded. For mobile devices in the idle state, a Serving Gateway (SGW) of the EPC terminates the downlink data path to the mobile device. The SGW also triggers a downlink data notification towards the MME that results in the MME paging of a given mobile device in response to a reception of downlink data directed to the idle mobile device.

In traditional paging, the MME individually pages the idle mobile device to indicate a presence of pending downlink data traffic. The paging message triggers the mobile device to reply with a service request. Processing of the service request transitions the mobile device to a connected state, allowing the mobile device to receive the user data via a unicast packet flow.

BRIEF DESCRIPTION OF THE DRAWINGS

Reference will now be made to the accompanying drawings, which are not necessarily drawn to scale, and wherein.

DETAILED DESCRIPTION

Figure 1:
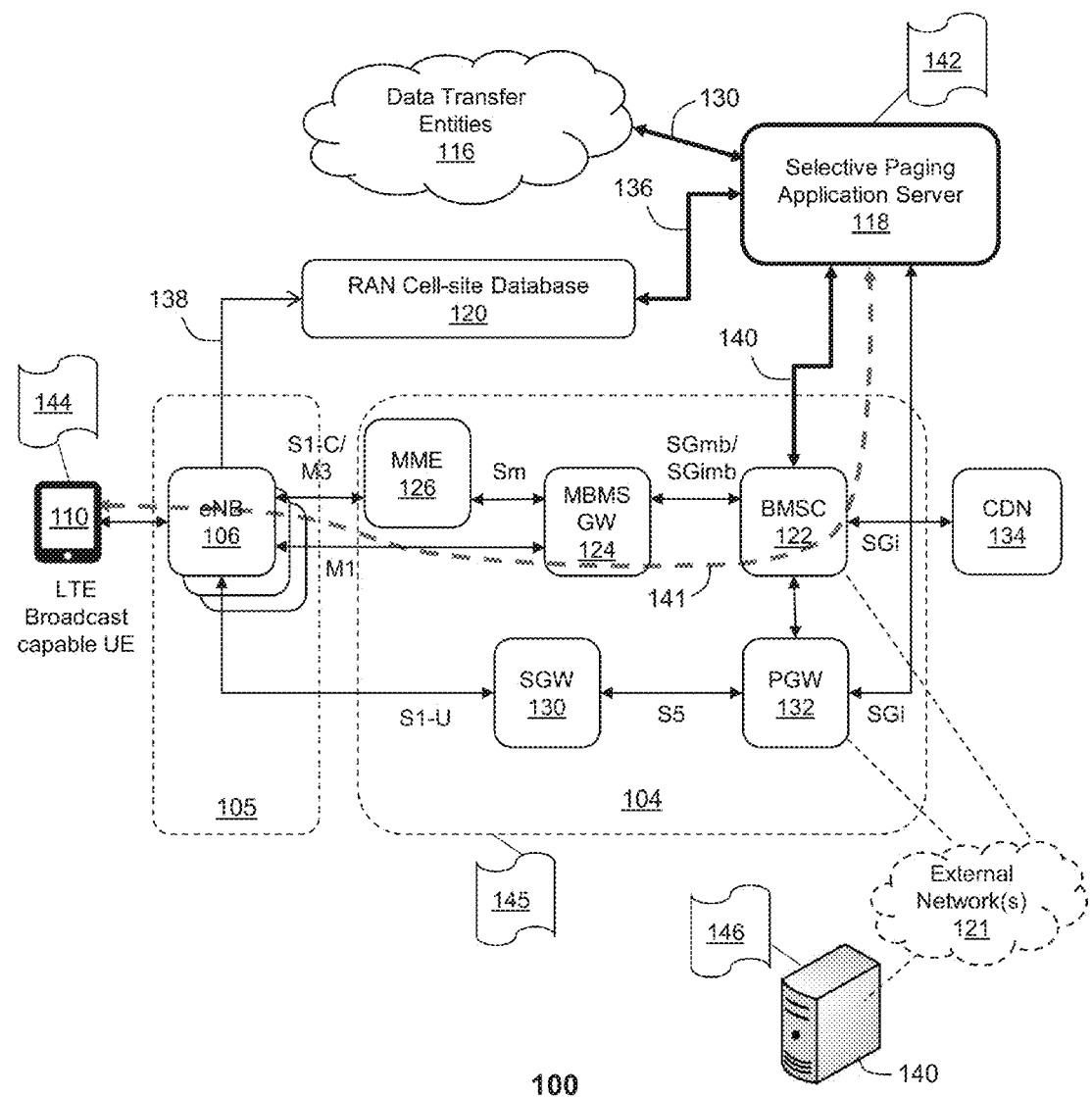
FIG. 1 depicts an illustrative embodiment of a broadcast paging system.

Traditional unicast paging methodology is not practical when downlink data is intended for large numbers of mobile devices in an idle mode. This is precisely the scenario envisioned for Machine-to-Machine (M2M) environments, such as the Internet of Things (IoT). Application of the unicast paging approach for such large numbers of devices would be expensive and result in an inefficient utilization of core network resources due to the paging of each device individually and associated signaling network management load. The signaling load becomes even greater when any of the paged devices are temporarily unavailable. In these circumstances, the paging cycle, which can take several seconds per device, is repeated independently for each unavailable device.

The subject disclosure describes, among other things, illustrative embodiments for a selective paging broadcast that utilizes a broadcast core network, e.g., a Multimedia Broadcast/Multicast Service (MBMS) network, or an evolved MBMS (eMBMS) network for LTE applications, as an intelligent and efficient means of delivering paging by providing data to large volumes and groups of wireless communication devices, including devices in an idle state or mode configuration. Other embodiments are described in the subject disclosure.

One or more aspects of the subject disclosure include a process that includes detecting a data transfer request to wirelessly transfer data to a class of wireless communication devices. A geographical region associated with the data transfer request is determined. Responsive to the data transfer request and based on the geographical region, a number of wireless base stations of a wireless mobility network are identified that provide wireless communication services within the geographical region, comprising a Multimedia Broadcast Multicast Service (MBMS) service. A wireless transmission is facilitated of a broadcast message by the plurality of wireless base stations, wherein the broadcast message identifies the class of wireless communication devices. The broadcast message initiates a state transition to an active state for wireless communication devices of the class of wireless communication devices configured in an idle state at a time of the wireless transmission of the broadcast message.

One or more aspects of the subject disclosure includes a device including a processor and a memory that stores executable instructions that, when executed by the processor, facilitate performance of operations. The operations include identifying a request to transfer pending data to a class of wireless communication devices within a geographical region. The operations further include identifying a number of wireless base stations of a wireless mobility network, responsive to the request, wherein the plurality of wireless base stations provide wireless communication services comprising a Multimedia Broadcast Multicast Service (MBMS) service within the geographical region. A wireless transmission is facilitated of a first broadcast message by the number of wireless base stations, wherein the first broadcast message identifies the class of wireless communication devices. The first broadcast message initiates a state transition to an active state for a plurality of wireless communication devices of the class of wireless communication devices configured in an idle state.

One or more aspects of the subject disclosure include a machine-readable storage medium, that includes executable instructions that, when executed by a processor, facilitate performance of operations. The operations include determining a request to transfer data to a group of wireless communication devices within an area. Wireless base stations of a wireless mobility network are identified, responsive to the request, wherein the wireless base stations provide wireless communication services within the area, including a Multimedia Broadcast Multicast Service (MBMS) service. A wireless transmission is facilitated of a first broadcast message by the wireless base stations, wherein the first broadcast message identifies the group of wireless communication devices. The first broadcast message initiates a state transition to an active state for a plurality of wireless communication devices of the group of wireless communication devices configured in an idle state.

FIG. 1 depicts an illustrative embodiment of a broadcast paging system 100 that includes a wireless mobility network 102 providing wireless services to wireless communication devices 110 within a wireless coverage region. In some embodiments, the wireless mobility network 102 includes a group communications service network architecture. The group communications service architecture provides a one-to-many communications capability that supports a sharing of resources, including a sharing of radio resources, such as radio spectrum.

In some embodiments, the wireless mobility network 102 can transmit data wirelessly over a multicast-broadcast single frequency network. Multimedia broadcasting, such as network television, cable programs, and/or sporting events, can be broadcast over the mobile communication system 102 using broadcasting and/or multicasting. Application service providers, such as equipment manufacturers, suppliers, maintainers, operators, and the like, can broadcast data, including instructions, software, software updates, features, configuration changes, and the like, over the wireless mobility network 102 using broadcasting and/or multicasting. The use of broadcasting and/or multicasting can provide the bandwidth and system efficiencies that are achieved by broadcasting via other channels, such as cable, satellite, and (to a lesser extent) the Internet. MBMS technology can provide live content, as well as popular file download delivery, to users of mobile communication devices 110 over the wireless mobility network 102.

In more detail, the example wireless mobility network 102 can be based at least in part on standards developed by the 3rd Generation Partnership Project (3GPP) initiative, with information available at www.3gpp.org. By way of non-limiting example, some 3GPP standards that address group communications system architecture using LTE broadcast (LTE-B) include: 3GPP TS 23.468, entitled "Group Communication System Enablers for LTE (GC-SE_LTE)"; 3GPP TS 25.324, entitled "Broadcast/Multicast Control BMC"; 3GPP TS 23.041, entitled "Technical Realization of Cell Broadcast Service (CBS)" and 3GPP TS 22.246, entitled "MBMS User Services," all incorporated herein by reference in their entireties.

In one embodiment, the wireless mobility network 102 includes a radio access network portion 105 and a core network portion 104, e.g., an Enhanced Packet Core (EPC) or common back bone that can communicate with one or more external networks, sometimes referred to as packet data networks or peer entities. It is envisioned, that the wireless mobility network 102 can include, without limitation, other configurations, such as those associated with General Packet Radio Service (GPRS), generally understood to serve the 2G and/or 3G cellular system.

The radio access network portion 105, without limitation, can include an LTE network architecture sometimes referred to as Evolved Universal mobile Telecommunication system Terrestrial Radio Access (E UTRA) and evolved UMTS Terrestrial Radio Access Network (E-UTRAN). Broadly, the radio access network portion 105 can include one or more wireless mobile terminals or communication devices, sometimes referred to as user equipment (UE), and one or more wireless access nodes, or base transceiver stations.

The base station 106, such as an evolved Node B (e-NodeB) in EUTRAN, communicates with the UE 110 over the air and wirelessly. The UEs 110 can include, without limitation, any device including a wireless communication capability, sometimes referred to generally as wireless devices, e.g., satellite communication systems, portable digital assistants (PDAs), laptop computers, tablet devices, other mobile devices. More generally, the wireless devices include any wireless network accessible device (e.g., cellular telephones, machines or "things," such as smart appliances, and so on). Although reference is made to user equipment, it is generally understood that the UE 110 can include network accessible devices that can operate without user intervention or control, e.g., as in Machine-to-Machine (M2M) scenarios, such as the Internet of Things (IoT). Such UEs 110 can connect to the eNBs 110 when the UE 110 is within range according to a corresponding wireless communication technology.

In some embodiments, the UE 110 executes application specific instructions that may or may not execute in association with an operating system. The instructions can include an operating system that can include one or more applications that engage in a transfer of data between the UE 110 and one or more of the external networks 121. Such data transfers can include downlink packet transfers from the external network 121 to the UE 110, uplink packet transfers from the UE 110 to the external network 121 or combinations of uplink and downlink packet transfers. Applications can include, without limitation, web browsing, VoIP, streaming media, file transfers, software updates, security, operation and/or control, application specific programs, and the like. In some embodiments, the data transfer includes streaming media, including one or more of audio, video, audio and video, text, still images, graphics, commands, video gaming content, and the like. Each data transfer can have an associated Quality of Service (QoS), such as a QoS imposed by an associated application. Different packet transfers can be served by different bearers within the core network 104, e.g., according to parameters, such as the QoS.

The core network 104 can use a concept of bearers, e.g., enhanced packet service (EPS) bearers, to route packets, e.g., IP traffic, between a particular gateway in the core network 104 and the UE 110. A bearer refers generally to an IP packet flow with a defined QoS between the particular gateway and the UE 110. The access network 102, e.g., E-UTRAN, and the core network 104 together set up and release bearers as required by the various applications.

The core network 104 includes various network entities, such as a Mobility Management Entity (MME) 126, a Serving Gateway (SGW) 130 and a PDN gateway (PGW) 132. In some embodiments, the MME 126 includes a control node that performs a control signaling between various equipment and devices in the radio access network 105 and the core network 104.

In one or more embodiments, the mobility network 104 can include one or more broadcast multicast service centers (BMSC) 122, or content servers 122, and one or more MBMS Gateway (MBMS-GW) devices 124, or broadcast media gateways 124. The content servers 122 can be capable of selecting, access, and/or receiving data, including messages, software, updates, and the like. The content servers 190 can receive data from data networks, content source providers (e.g., equipment manufacturers, operators, maintainers, television networks or production companies, or sporting leagues), satellite feeds, and/or cable networks. The mobility network 104 can direct a content server 190 to select a particular data item or set of data items for broadcast to user devices 110 via the mobility network 104 and radio access network 105.

In one or more embodiments, the mobility network 104 can include one or more MBMS-GWs 124. Each broadcast/multicast media gateway 124 manages data paths for transfer of data, including transmission of media, from a content server, referred to generally as a Content Data Network (CDN) 134 to one or more end user devices 110. In one embodiment, a MBMS-GW 124 can initiate multicast groups, which can allow end user devices 110 to receive multicast content at eNodeB nodes 106. The MBMS-GW 124 can associate each multicast group under its control with unique Internet Protocol (IP) addresses and can offer access to broadcast content that is associated with the multicast group to the end user devices 110 via one or more eNodeB nodes 106. In one embodiment, end user devices 110 can join an offered multicast group by sending a session initiation protocol (SIP) JOIN message to the offering MBMS-GW 124.

In one or more embodiments, the MBMS-GW 124 can manage the initiation and maintenance of bearer paths for transmitting broadcast data to the user devices 110. In one or more embodiments, the MBMS-GW 124 can initiate MBMS sessions with bearer path contexts that are associated with each end user device 100 that has joined each multicast group. The bearer path allows the end user device 110 to receive multicast and/or broadcast data from the MBMS network 130. The MBMS-GW 124 can store MBMS session attributes for each bearer context. When a bearer path has been initiated, the MBMS-GW 124 can initiate tunnels for user data traffic to particular eNodeB nodes 106 that service end user devices 110 in a particular serving area.

In one or more embodiments, the CDN 134 can transmit media content to BMSC that could send the data to one or more MBMS-GW 124 as a unicast data transfer, including a message, a data file, an image, audio, and/or a media stream. In one example, the content server 134 can transmit a direct, unicast stream and/or broadcast message and/or data item to each MBMS-GW 124. In one or more embodiments, the MBMS-GW 124 can generate a multicast and/or broadcast data stream from a received unicast data stream. The MBMS-GW 124 can transmit the multicast and/or broadcast data stream via the bearer path, and the multicast IP address for multicast applications. End user devices 110 that are members of the multicast group for the broadcast media can receive the multicast data transfer from the eNodeB 106 using the multicast IP address.

In one or more embodiments, the mobility network 104 can include a pool of MBMS-GW devices 124 that are deployed in a distributed architecture (i.e., not centralized) in data centers spread across a geographic region that is served by an LTE broadcast service area. In one embodiment, an LTE broadcast service area can be coincident with a geographic region. A series of BMSC groups 122 can, for example, be spread across an LTE broadcast service area to provide multicast-broadcast content to user equipment devices 110 in the broadcast service area.

For illustration purposes only, the MME 126, the SGW 124, the PGW 132, the BMSC 122 and the MBMS-GW 124 network elements or nodes, and so on, can be server devices, but may be referred to in the subject disclosure without the word "server." It is also understood that any form of such servers can operate in a device, system, component, or other form of centralized or distributed hardware and software, including virtual machines, e.g., in relation to software defined networks. It is further noted that these terms and other terms such as bearer paths and/or interfaces are terms that can include features, methodologies, and/or fields that may be described in whole or in part by standards bodies such as the 3GPP and IETF. It is further noted that some or all embodiments of the subject disclosure may in whole or in part modify, supplement, or otherwise supersede final or proposed standards published and promulgated by 3GPP/IETF.

The PGW 132 can provide connectivity between the UE 110 and one or more of the external networks, referred to generally as a content data network (CDN) 134. In the illustrative network architecture 100, the PGW 132 can be responsible for IP address allocation for the UE 110, as well as one or more of QoS enforcement and flow-based charging, e.g., according to rules from a policy and charging runes (PCRF) (not shown). The PGW 132 is also typically responsible for filtering downlink user IP packets into the different QoS-based bearers. In at least some embodiments, such filtering can be performed based on traffic flow templates. The PGW 132 can also perform QoS enforcement, e.g., for guaranteed bit rate bearers. The PGW 132 can also serves as a mobility anchor for interworking with non-3GPP technologies such as CDMA2000 and WiFi.

With increasing numbers of users/devices receiving the same services, efficient information distribution is essential. To this end, group communications, such as broadcast and/or multicast techniques are provided to decrease the amount of data within the network 100 and a sharing of limited radio spectrum, resulting in a more efficient use of network resources. In particular, broadcast and multicast are techniques for transmitting data-grams from a single source, such as a selective paging application server 118, e.g., that facilitates a selective paging function, and or the CDN 134 to several destinations, e.g., point-to multipoint. The selective paging application server 118 and/or a group communication server of the CDN 134 can support exchanging signaling, e.g., signaling (including GCS session and group management aspects) with UEs 110, in some instances, receiving uplink data from UEs 110, delivering data to all UEs 110 belonging to a group, e.g., using unicast and or MBMS delivery, transporting application level session information, and supporting service continuity procedures, e.g., for a UE 110 to switch between unicast/MBMS delivery.

Generally speaking, a multimedia broadcast/multicast service refers to a unidirectional point-to-multipoint service in which data is transmitted from a single source entity to a group of users in a specific area. In at least some embodiments, the MBMS services transmit content over a multicast-broadcast single frequency network. The broadcast/multicast service has two possible modes: Broadcast mode and Multicast mode. A broadcast session includes a continuous and time-bounded reception of a broadcast service by the UE 110. Likewise, a multicast session is a continuous and time-bounded reception of a multicast service by the UE 110.

A broadcast service can be defined as a unidirectional, point-to-multipoint service in which data is efficiently transmitted from a single source to multiple UEs 110 in an associated broadcast service area. Broadcast services may be received by UE 110 configured to access broadcast service locally, and who are in the broadcast area defined for the service. Likewise, a multicast service can be defined as a unidirectional point-to-multipoint service in which data is efficiently transmitted from a single source to multiple UEs 110 in an associated multicast service area. It is generally understood that a multicast service is directed to a multicast subscription group. For example, UE access to a multicast service requires a subscription associates the UE 110 with the service. Broadcast and/or multicast services may be received by all UEs 110 configured to receive broadcast and/or multicast service(s), and fall within an associated broadcast/multicast area defined for the service. For example, the broadcast/multicast service area can be determined according to wireless coverage maps of base transceiver stations 106, e.g., sectors, regions and so on, that provide broadcast/multicast service. The UEs 110 can be configured to monitor one or more broadcast channels for such broadcast/multicast messages. The UEs 110 can be configured to monitor a selective paging channel, such as a broadcast channel, whether the UE 110 is in an idle state or an active state. The UE 110 does not need to be attached to any particular eNB 106 while monitoring the broadcast channel.

The broadcast-multicast service area can represent a geographical area, such as a region, a state, county, town, an area defined by a geometric shape, such as a polygon, circle, ellipse, a piecewise continuous closed shape or some combination thereof in reference to a geographical region, e.g., as defined by a map. In some applications the broadcast area can be defined individually per broadcast service application, per broadcast service subscriber, and the like. For example, an emergency broadcast message can have a broadcast area associated with a content of the message, a subscription of the service. Consider an emergency broadcast message directed to an area affected by a natural event, such as a hurricane, a flash flood or a forest fire, an Amber Alert, and the like. In some embodiments, the group communication service area is identified by a requesting entity, such as a news station, a government entity, and so on.

For group communications services, the example network architectures 100 include an interface 140 or reference point by which the MBMS services of the mobility network can be accessed. For example, in LTE applications, the selective paging application server 118 can be implemented by a Group Communication Service Application Server (GCS-AS), in which instances the interface or reference point 140 can include features of an MB2 interface. This represents one possible implementation option. The MB2 interface 140 can include a signaling or control plane interface, e.g., MB2-C, and a data or user plane interface, e.g., MB2-U. As illustrated, the MB2 interface 140 can exist between the BMSC 124 and the selective paging application server 118, or more generally between the BMSC 124 and a Group Communication Service Application Server (GCS-AS). It is understood that the particular network elements of the example network architecture 100 are representative. Although the MB2 reference point 140 is disclosed in certain industry standards, it is understood that any reference to MB2 herein can include features of applicable industry standards, with or without additions, deletions and modifications to any applicable standardized features. In at least some embodiments, the MB2 interface 140 or reference point provides an ability for applications to request an allocation and/or de-allocation of a set of TMGIs, a request to activate, deactivate and modify an MBMS bearer, and for allowing the BMSC 122 to notify an application of the status of an MBMS bearer. In at least some embodiments, the MB2 reference point 140 can include one or more other features disclosed herein, such as supporting a selection of a particular network element and/or network configuration in relation to an establishment and/or maintenance of any MBMS bearer services.

In establishing a new group communication service, e.g., in response to a request from the selective paging application server 118, the BMSC 122 can initiate a group communication service session request directed to the MBMS-GW 124. The MBMS-GW 124 responds to the BMSC 122 with session response. The MBMS-GW 124 then sends a session start request to the MME 126, which sends it to the eNB 106, e.g., on an M3 Stream Control Transmission Protocol (SCTP) based interface. In response, the eNB 106 sends a session start response to the MME 126, which sends it to the MBMS-GW 124. Upon successful establishment of the session and radio resource allocation, the eNB 106 can join the transport network IP multicast address to receive the user data from MBMS-GW 124.

An example broadcast and/or multicast bearer path 141 is illustrated between the selective paging application server 118 and the UE 110. Other network elements along the broadcast and/or multicast bearer path 141, include the BMSC 122, the MBMS-GW 124 and the eNB 106. In some embodiments, the broadcast and/or multicast path extends from another data source, such as the content data network 134. Thus, the selective paging application server 118 can request a broadcast and/or multicast service based on data item(s) from another source, such as the CDN 134. It is understood that, in some instances, broadcast and/or multicast datagrams can be routed to more than one UE 110 attached to the same eNB 106. Alternatively or in addition, broadcast and/or multicast datagrams can be routed to more than one UE 110 attached to different eNBs 106.

Without limitation, reference to various interfaces, such as S1, S5, S11, M1, and M3 refer to EPS interfaces. In some instances, such interface designations are combined with a suffix, e.g., a "U" or a "C" to signify whether the interface relates to a "User plane" or a "Control plane." In addition, the core network 104 can include various signaling bearer paths/interfaces, e.g., control plane paths/interfaces. The bearer paths and signaling bearer paths are only illustrated as examples and it should be noted that additional bearer paths and signaling bearer paths may exist that are not illustrated.

Figure 2:
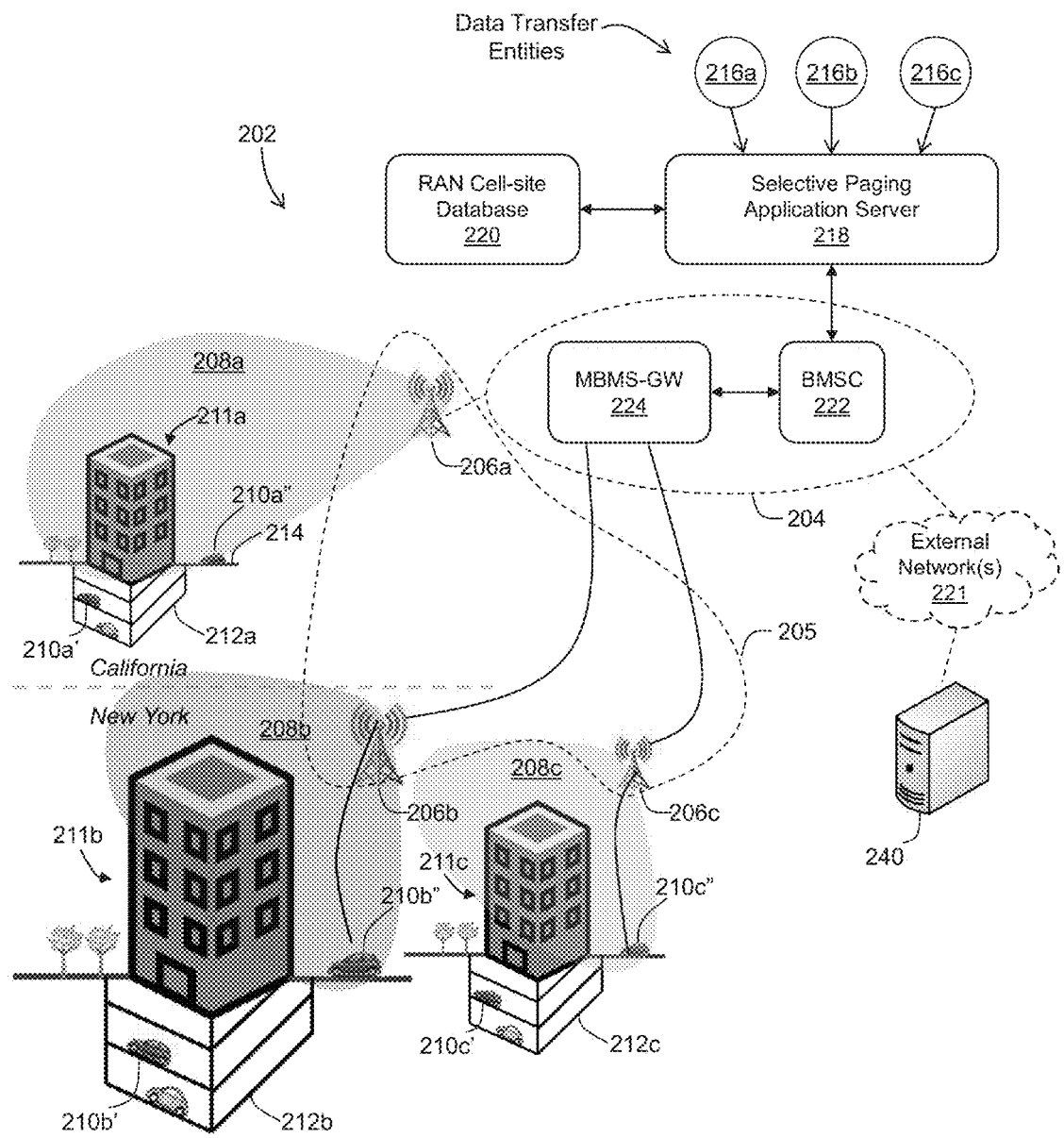
FIG. 2 depicts an illustrative embodiment of an LTE broadcast paging system.

FIG. 2 depicts an illustrative example of an LTE broadcast paging system 200 that includes a RAN portion 205 and a core network portion 204. The RAN portion 205 includes three base station terminals 206a, 206b, 206c, generally 206. The first base station terminal 206a provides wireless services within a first wireless coverage region 208a, e.g., a location in California. Likewise, the second and third base station terminals 206b, 206c, provide wireless services within second and third wireless coverage regions 208b, 208c, e.g., non-overlapping regions in New York. In the illustrative example, the wireless communication devices include a vehicle 210, and or an equipment item or subsystem of the vehicle, such as an on-board computer, a vehicle maintenance tracking system, a vehicle emergency communication system, a surveillance system and/or a navigation system. Subsequent references to the vehicle 210 should be understood to include one or more of the aforementioned subsystems. During network operations, at least one base station 206 can generally communicate with the vehicle 210, while the vehicle is within a corresponding wireless coverage region of the base station 206. It is understood that there may be circumstances in which the vehicle 210, despite being within the coverage region, is unable to communicate with the base station 206. By way of non-limiting example, such circumstances include radio frequency (RF) interference. RF blockage or weak signal, power on/off status of the vehicle 210/on-board device or system, and so on.

For example, in the illustrative example, a first facility 211a, such as an office building, or apartment complex includes an underground parking facility 212a. Likewise, second and third facilities 211b, 211c include underground parking facilities 212b, 212c. Each of the facilities 211a, 211b, 211c, generally 211, includes a vehicle 210a', 210b', 210c', generally 210', within the underground parking facility 212a. 212b, 212c, generally 212. Each of the facilities 211 also reflects the same vehicle 210a", 211b", 210c", generally 210", e.g., at a different time, along an above-ground surface 214. It is understood that the vehicles 210' may not be able to communicate with the base stations 206 while inside the garage 212 due to RF blockage. It is also understood that the vehicles 210" would generally be available to communicate with the base stations, while not inside the garage 212, presuming the vehicles 210" are within the wireless range of a broadcasting base station 206. Thus, any attempts by the network 204 and base stations 206 to page vehicles 210' while inside the garage 212 will likely be unsuccessful due to the RF blockage.

In some embodiments, a paging message can be repeated according to a schedule. The schedule can include one or more of a total number of pages, a paging duration including a time period within which a paging message is repeated, a paging frequency, paging times, and so on. Repeating the same page to the same group of vehicles 210 within the same targeted paging area 208, over an extended time period allows for vehicles 210' that may have been unavailable for an initial page, e.g., in the garage, to receive a subsequent page that occurs during the paging period, while the vehicle 210" is out of the garage.

In an illustrative example, each of the vehicles 210 listens to a broadcast channel of the mobility network 200, whether the vehicle 210 is in idle mode or an active mode, including unconnected and connected modes. A data transfer entity, such as an equipment manufacturer, a supplier, a maintainer, an insurer of the vehicle 210, or onboard system, intends to perform certain actions to a class or group of vehicles, and/or onboard systems, within a target geographical region, e.g., New York, by way of the mobility network 200. A selective paging broadcast function, e.g., by way of a selective paging broadcast server 218, queries or otherwise accesses a cell-site records, e.g., by way of a RAN cell-site database 220, to identify any cell sites providing wireless services within the target geographical region.

The selective paging broadcast server 218 creates a short broadcast message including indicia of the targeted class or group of vehicles 210 and/or vehicular subsystems. The indicia can include a manufacturer, make, model, serial number range, lot number, product identification code, vehicular identification code, a signature, an owner (e.g., a fleet owner or operator), a user, an operator, and the like. The selective paging broadcast server 218 sends the short broadcast message to the core network 204 for forwarding to the identified cell sites of the target geographical area. In the illustrative example, the message is sent to the cell sites 208b, 208c in New York, without being sent to other cell sites, such as cell sites 208a in other states, e.g., California. The core network 204, in turn, initiates a broadcast of the short broadcast message through the identified base stations 208b, 208c of the target geographical area, without sending the short message, or otherwise initiating a broadcast through cell sites 208a outside of the target region.

The vehicles 210 in the coverage area, whether in idle or connected mode, listen to a broadcast channel of the mobility network 202. Any broadcast messages are evaluated by the vehicles 210 to identify the class/group indicator, e.g., a unique value, symbol, code or signature. Broadcast messages having a unique value that is not associated with the vehicle 210 are ignored by the vehicle 210 or subsystem. Broadcast messages having a unique value that is associated with the vehicle 210 are processed further, e.g., as indicated below.

Any vehicles 210' in the coverage area, but unable to receive a particular broadcast message, e.g., due to blockage, continue to monitor the broadcast and/or paging channel. When any such blockage or interference is removed, e.g., when the vehicle 210" emerges from the garage 212, the continuous monitoring of the broadcast and/or paging channel allows the vehicle 210" to receive a subsequent page of a repeating paging schedule. Once the short broadcast message is received and the unique value or signature matched to the vehicle 210", the vehicle 210" recognizes the broadcast feed and performs a related action.

Actions can include, without limitation, interpreting data contained in the broadcast message itself. For example, in some embodiments, the short broadcast message can include a payload portion. The payload portion can include data, such as value or code providing an instruction that can be interpreted by the targeted vehicle 210". For example, the targeted vehicle 210" can include pre-programmed instructions that enact one or more predetermined procedures based on the data value. In some instances, the instruction can provide an indication that further data is available by way of another message. The other message can include download data packets, such as a packet stream, that is broadcast to the target devices, e.g., through the identified base stations 206, by way of a separate MBMS service. Thus, a broadcast paging message provided on one broadcast/paging channel, can announce services on the same and/or a different broadcast channel. The different broadcast channel can be distinguished by one or more of a time slot, frequency, and code of a code division multiplexed configuration, and the like.

The MBMS service can include a broadcast service, by which data content is distributed according to a broadcast. A broadcast service, e.g., announced by the short broadcast message, can be accessed by the targeted vehicles 210" that receive the message. Namely, the targeted vehicles 210" can tune or otherwise access the broadcast stream. Alternatively or in addition, the MBMS service can include a multicast service, by which data content is distributed according to a multicast stream. A multicast service, e.g., announced by the short broadcast message, can be accessed by the targeted vehicles 210" that receive the message. For example, the targeted vehicles 210" can join or otherwise access the multicast stream. In at least some embodiments, the short broadcast message can include a multicast IP address that can be used by the targeted vehicles 210" to join the multicast stream being served by the base stations that have joined the specific MBMS GW nodes.

Although the examples provide herein refer to vehicles and/or on-board devices or systems as the wireless communication devices, the disclosure should be understood to apply to wireless communication devices more generally. This can include wireless mobile devices, such as vehicles, smart phones, tablet processors and laptop computers. Other wireless communication devices are not mobile, such as smart meters, e.g., home/building utility meters—gas, water, electricity and so on. Wireless devices can include medical devices, such as biomedical devices including, without limitation, implantable devices, wearable devices, hospital and/or home medical monitoring devices, the like. Medical devices can include diagnostic devices, e.g., heart monitors, blood glucose monitors, drug delivery devices, biological pumps, controllers and so on.

As for vehicular devices, they can include the vehicles, e.g., automobiles, themselves, equipment in the vehicle, e.g., updated map software for a navigation system, diagnostic monitoring systems, e.g., mileage, fluids, tire pressures, engine performance, etc. Vehicles can include, without limitation, trucks, busses, trains fleets of vehicles, e.g., trucking company, self-driving vehicles, equipment on such vehicles. Air vehicles can include, without limitation, aircraft, drones, military equipment and ordnance. Other applications include manufacturing, e.g., robots, machines, processors, and the like. Still other applications include business applications, such as retail outlets, e.g., gas stations tracking supplies/sales, supermarkets, wholesale facilities, e.g., tracking warehouse inventories, shelf lives, etc. Durable goods, e.g., home appliances and the like. In general, wireless communication devices can include any device, mobile or stationary, that can communicate with the wireless mobility network via the radio access network.

The short broadcast messages can be used by data transfer entities in the tracking of performance and/or status, in updating software, e.g., in providing software patches, fixes, updates, and the like. In at least some embodiments, the short broadcast messages can be used by the data transfer entities to deliver, revise or otherwise modify operational or business rules of the wireless communication device, or another device in communication therewith. To that end, it is envisioned that the wireless communication devices can be part of other systems, such as the vehicles, the processors, devices, and appliances. Namely, a wireless communication device, e.g., operating according to a wireless protocol, such as LTE, can be in communication with an associated device. Thus, data can be exchanged between the associated device and a remote entity by way of the wireless communication device. In this capacity, data content received by way of the broadcast messages can be used by the wireless communication device, the associated device, or both.

It should be understood that the group communication service messages, e.g., MBMS/eMBMS messages disclosed herein, can include a type of service (broadcast/multicast), an associated radio frequency channel(s), timing/schedule, authorization/encryption/key info, multicast IP addresses, and the like.

Figure 3:
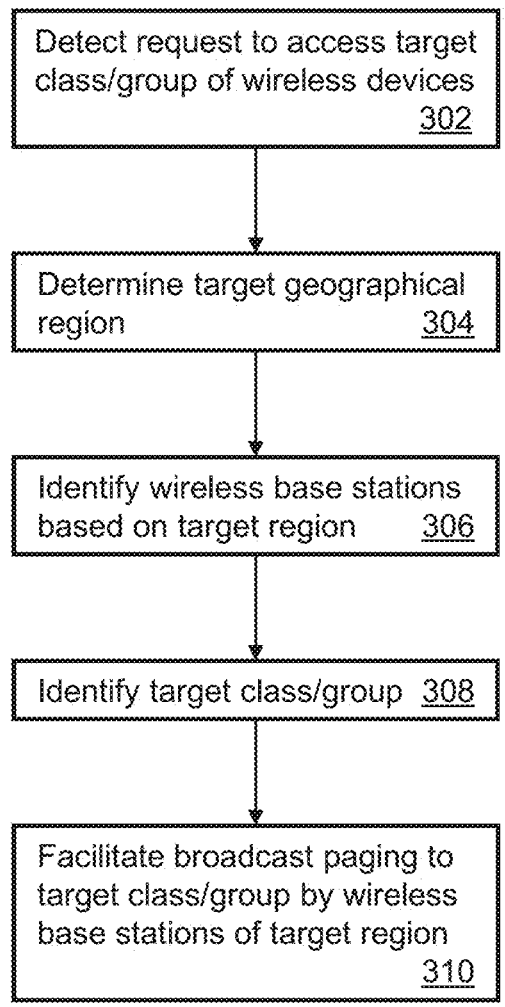
FIG. 3 depicts an illustrative embodiment of a process used in portions of the system described in FIGS. 1 and 2.

FIG. 3 depicts an illustrative embodiment of a process 300 used by the systems 100, 200 of FIGS. 1 and 2. The process includes detecting a broadcast data request to access target class/group of wireless devices at 302. The request can include a message received from another entity, such as the data transfer entities 216a, 216b, 216c, generally 216, indicating that download data is available for the target class/group of wireless communication devices. These entities can include, without limitation, equipment manufacturers, service providers, e.g., network service providers, owners, operators, maintainers, business organizations, enterprises, governmental organizations, educational institutions, and the like.

In at least some embodiments, the broadcast data request includes a field that identifies the target class/group. For example, a request from an auto manufacturer BMW® to access an onboard system of the "Series 3" automobiles. It is envisioned identification of such a target class/group can include further details, such as year or range of years, model options/features, and the like. In some instances, a field identifying the target class/group includes a unique value, such as an alphanumeric value or signature. Such signature values would allow a rather complex description of a particular device, i.e., "BMW, 320i, 2015, sedan, manual transmission, . . . " can be reduced to a shorter numeric value, e.g., "BM32SM15." In some instances the unique signature values can include a product code, such as a vehicle identification number, or range of numbers. In some embodiments, hashes and/or other algorithms can be used to generate and/or interpret such identifying codes.

Translations can be performed by the data transfer entities 216, by the selective paging broadcast server 218, or by another server, such as the server 240. For example, the other server 240 can be operated by a third party, any of the data transfer entities, or the network service provider. However the target class/group is identified in the message, the mobile communication devices 210 include features, e.g., machine-readable instructions 144, that allow the device 210 to properly identify when a paging broadcast message is directed to it as a member of the targeted class/group.

In some embodiment, the request message also includes a geographic region. The geographic region, e.g., can be used by a data transfer entity to download data in an orderly manner. Alternatively or in addition, another entity, such as the network operator, can specify the target region. Consider an auto manufacturer that needs to roll out new software to all diesel vehicles in North America. The manufacturer, as a data transfer entity can identify North America as a target region in its request—it is understood that in some instances, a request may not include a region, in which case the region can include all cell sites of one mobility network, cell sites of another mobility network, another country, region, etc. In some embodiments, a network service provider can apply analytics to the request to determine a strategic rollout of the software in a staged manner that takes into consideration any of various factors, such as network capacity, network congestion, network costs, estimates of numbers of wireless communication devices, and the like. Thus, a request made during a busy hour can be deferred to quieter times, such as early morning, weekend, etc.

A target geographical region is determined at 304. In some embodiments, the target geographical region can be determined directly from the request, e.g., "New York." Alternatively or in addition the target geographical region can be determined from a processing of the request in view of network analytics, among other factors. Thus, a large area, such as North America can be broken into regions, such as states, territories, counties, bounded regions of a map, and combinations thereof.

Wireless base stations are identified at 306 based on target region. Once the target geographical region has been identified, it can be used in combination with cellular coverage maps to identify one or more base stations that provide coverage to the target geographical region. In some embodiments, the base stations provide full coverage spanning the entire target geographical region. Alternative, the base stations may provide a partial coverage, as coverage may not be available in certain portions of the geographical region. Nevertheless, a suitable number of base stations are identified based on the target geographical region.

A target class/group is identified at 308. As indicated above, the target class/group can be determined from the request itself. It is understood, however, that in at least some instances, the request may generate from a reception of downlink data at a network node, such as the SGW 130. The downlink data can include an address, e.g., and IP address, that can be mapped or otherwise associated with the target class/group of devices. In such scenarios, the network service provider can seek an identity of the target class/group. This can be accomplished by storing or otherwise accessing an association of a data IP address and a corresponding class/group of devices. In some instances, the network service provider can query the data transfer entity associated with the data and or a third party, such as the server 140 providing a coordinating service.

Broadcast paging to the target class/group in the target region is facilitated at 310 by way of the identified wireless base stations. For example, the selective paging application server 118, e.g., facilitating a selective paging function, forwards a request to the BMSC 122 to broadcast a broadcast message in each of the identified base stations. The broadcast message can include indicia of the target class/group of devices, as well as one or more of a message that invokes a corresponding action at wireless communication devices of the targeted class/group. For example, the message can inform the wireless device that a broadcast message will commence at a particular time, e.g., and on a particular broadcast channel. This can include identification of one or more of a frequency and a time slot.

In some embodiments, the request prompts a selection between a broadcast, a multicast and/or a unicast service for paging the target class/group of devices. For example, such a selection can be based on set of attributes. In some instances, a mobile operator decides which service based on one or more of the identified base station(s), the identity of the target class/group, the target region, and so forth. Network analytics can be applied in a determination, e.g., based on a number of wireless devices per base station and/or sector coverage area, the type and/or quantity of data to be transferred, a priority, network charges, subscriptions, and the like.

An estimate of a number of wireless devices can be based on one or more of device/product registration data, historical communication records, population, number of households, income and/or other demographics, or any other means of estimating. For example, historical records can be created and/or updated by devices periodically connect to network to complete status reporting and/or scheduled/on-demand data transfers based on combination of triggers received from device/network and application service providers. It is also envisioned that learning can be applied based on a network analytics function that includes cell site data, targeted coverage area, device type, priority access, etc.

In at least some embodiments, a response to a selective broadcast page, e.g., including a transfer data (e.g., message and/or content) to UE, is accomplished for UE that are not in the connected state on the MME 126. A transfer of data, e.g., data arriving at the SGW 130, can be facilitated to the UE 110, including UE 110 in an idle state or mode, without requiring the UE 110 to initiate a service request and/or otherwise attach to the mobility network 104. In at least some applications data transfer to a group of UE 110 is initiated for UE 110 in an idle state or mode, without reliance on traditional, e.g., unicast paging.

In at least some embodiments, any target devices 110 temporarily out of coverage during a selective paging broadcast message, receive the broadcast message upon returning into coverage of selected eNBs. There is no need for UE to provide location information in association with accessing broadcast content disclosed herein. Likewise, there is no need for a notification server to repeatedly invoke unicast updates when devices are temporarily unreachable.

In at least some applications, particularly for M2M and IoT applications, the paging and any subsequent actions undertaken by the wireless device and/or the network can occur without requiring the devices to respond to paging. This avoids any necessity for the devices to attach to the network, etc., to avoid corresponding network congestion that might otherwise be created. In general, an idle mode is considered to include a wireless device (UE) that is powered on but does not have a Radio Resource Control (RRC) connection to the radio network. In the idle mode, a UE can perform: PLMN selection; cell search & selection: cell reselection; Tracking Area (TA) update; and periodic paging monitoring. In response to monitoring a page that identifies the device, the device can transition to an active mode, in which the device may change one or more of a power status, processing capacity, and the like, without necessarily attaching to the wireless mobility network. For example, in the active mode, the device can receive a broadcast message at a predetermined time and channel, without requiring any special action on the part of the mobility network.

In some embodiments, the wireless device transitions to an active mode upon receipt of the page message. The transition can be immediate, or after some processing delay, e.g., time to allow the device to detect the page message and to determine that the device has been targeted. A transition from idle to active states can be referred to generally as a service request. It is conceivable that in some applications, a large number of targeted devices residing within a single cell or region may receive and respond to the same page message. In at least some instances, concurrent service requests from multiple targeted devices can result in network traffic and possibly interference.

In at least some embodiments, a delay can be introduced, to avoid network congestion of multiple service requests from the multiple devices. For example, each of the wireless devices can have an associated delay value. A unique delay value can be provided for every device, e.g., stored within the device, such that a number of devices that receive the same page message will transition to active mode, or submit a service request, at a uniquely different time based the unique delay values. Alternatively, a set of delay values can be assigned to the devices, such that not every device, but groups of devices have different delay values.

It is understood that in at least some embodiments, a delay value can be determined by the wireless devices. For example, each wireless device can include functionality that determines a device delay value that can be implemented for every page message targeting the device. Alternatively or in addition, each wireless device can include functionality that determines an updated, different delay value for each page message. Delay values can be determined according to an algorithm and/or based on a random number generator. In some embodiments, the page message can include information that can be used to determine delay values, e.g., providing a seed value that can be used by a delay determining algorithm of the wireless device.

Beneficially, the broadcast paging and data transfer techniques disclosed herein avoid any need for a notification server to repeatedly invoke unicast updates when devices are temporarily unreachable. As indicated, the MBMS messages can be repeated according to a schedule and for a duration. The duration might extend for hours, days, weeks, months or longer. The schedule might include the broadcast to be provided once per day or longer, e.g., at the same hour each day, or at a different hour each day.

Beneficially, there is no need for the wireless communication devices to provide location information to the system. They just have to be in a target geographical area and in a sector served by a base station of the mobility network during an occasion of the MBMS/eMBMS message. This allows targeted devices to receive data downloads, instructions, etc., without a need to independently page the wireless communication devices.

In some embodiments, the wireless communication devices can be configured to always listen to a network broadcast channel in idle and connected modes. To this end, a device that happens to be in a connected mode will still receive the MBMS/eMBMS service message. The network can be presented with an option to transfer data by way of an existing connection for any connected devices. Alternatively or in addition, the network can provide the corresponding data/instruction to all devices in the same manner, e.g., by broadcast message.

Figure 4:
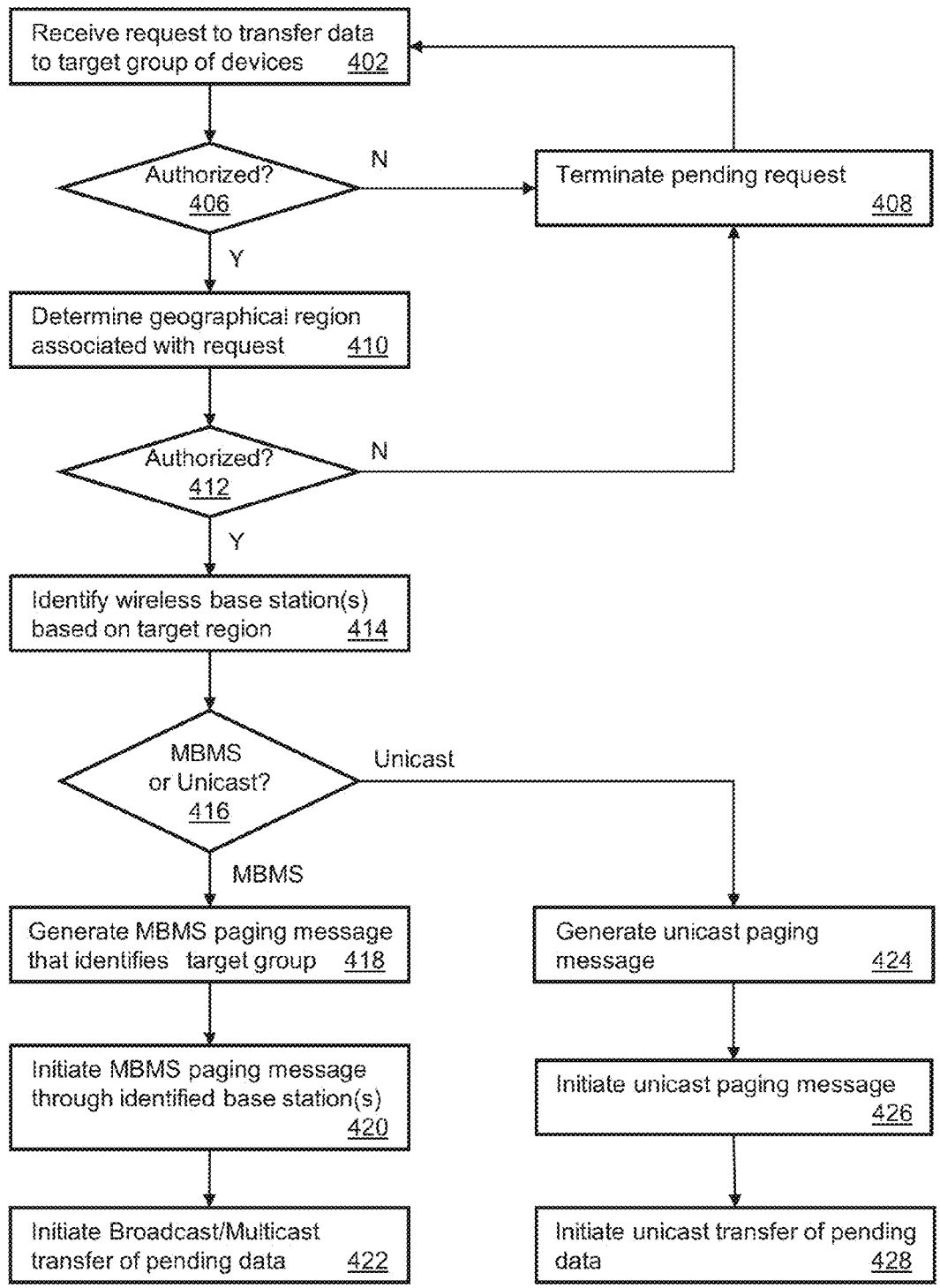
FIG. 4 depicts an illustrative embodiment of another process used in portions of the system described in FIGS. 1 and 2.

FIG. 4 depicts an illustrative embodiment of another process used by the systems 100, 200 of FIGS. 1 and 2. A request to transfer data to target group of devices is received at step 402. Without limitation, the request can be received by the selective paging application server 118, e.g., from the data transfer entity 216 and/or by downlink data arriving at a node of the mobility network, such as the SGW 124, as disclosed herein.

A determination is made at 406 as to whether the pending request is authorized. To the extent that the pending request is not authorized, it is terminated at 408. To the extent that the pending request is authorized, a geographical region associated with request is determined at 410. The region can be identified by the request itself, by the mobility network, by a third party service provider, or by any other suitable means of identifying a region that relates to the request.

A determination is made at 412 as to whether the pending request is authorized for the associated geographical region. To the extent that the pending request is not authorized, it is terminated at 408. To the extent that the pending request is authorized, one or more wireless base station(s) are identified at 414, based on the target region. The identified base stations provide coverage within the target region. In some embodiments, the base stations provide coverage to the entire region, whereas in others such coverage is not possible. In the latter situation, the base stations are identified to provide the best coverage possible. The determination can be performed by the selective paging application server, by the network service provider, or by a third party service provider.

In some embodiments a subsequent determination is made at 416 as to whether any paging will be accomplished by an MBMS service and/or a Unicast service at 416. It is understood that the MBMS/unicast determination can be determined globally for all identified base stations, or individually for each of the identified base station or sub-groups of base stations.

To the extent that MBMS service is selected, an MBMS paging message is generated at 418, identifying the target group 418. An MBMS service is initiated at 420 and the paging message is distributed by way of the MBMS service. To the extent that additional data is associated with the paging message, an MBMS transfer of the pending data is initiated at 422. It is understood that an MBMS service for the paging service and the MBMS service for the subsequent data can be the same or different. For example, one can be provided by way of a broadcast message, whereas, the other can be accomplished by way of a multicast message.

To the extent that unicast service is selected, one or more unicast paging messages are generated at 424, identifying members of the target group. A unicast service is initiated at 426 and the paging message is distributed by way of the unicast service. To the extent that additional data is associated with the paging message via MME 126, a unicast transfer of the pending data is initiated at 428. It is understood that the same unicast service or different unicast services can be used for each of the paging message and the subsequent data transfer.

While for purposes of simplicity of explanation, the respective processes are shown and described as a series of blocks in FIGS. 3 and 4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

The UE 110, 210, and selective paging application server 118, 218 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the core network 104, 204, or other infrastructure services.

The subject disclosure can apply to other present or next generation over-the-air and/or in combination with landline media content services system.

Some of the network elements of the system 100, 200 can be coupled to one or more computing devices 140, a portion of which can operate as a web server for providing web portal services over the wireless mobility network 100 to wireless communication devices 110.

Multiple forms of media services can be offered to wireless communication devices 110, 210 by way of the wireless access base station 106, 206 operating according to common wireless access protocols such as Global System for Mobile or GSM, Code Division Multiple Access or CDMA, Time Division Multiple Access or TDMA, Universal Mobile Telecommunications or UMTS. World interoperability for Microwave or WiMAX, Software Defined Radio or SDR. Long Term Evolution or LTE, and so on. Other present and next generation wide area wireless access network technologies can be used in one or more embodiments of the subject disclosure.

The cellular access base station 106, 206 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, in at least some embodiments, multiple wireline and/or wireless communication technologies can be used by the UEs 110, 210.

The server 140 can be operably coupled to the communication system 100, 200 for purposes similar to those described above. The server 140 can perform function 146 and thereby provide selective broadcast paging of wireless device services to the wireless communication devices 110. The wireless communication devices 110 can be adapted with software to perform function 144 to utilize the selective broadcast paging of wireless device services. The selective paging application server 118 can be adapted with software to perform function 142 to utilize the selective broadcast paging of wireless device services. For example, the selective paging application server 118 can receive one or more of an identification of a geographical area, a type or class of wireless communication device or other device or system associated with the wireless communication device, priorities of one or more of the device, the message, a class of service, and the like. A priority can be used, for example, to selectively page higher priority over lower priority, to set paging cycles, counts, frequency, etc.). Likewise, in at least some embodiments, one or more elements of the core network 104 can be adapted with software to perform functions 141 to utilize the selective broadcast paging of wireless device services.

Figure 5:
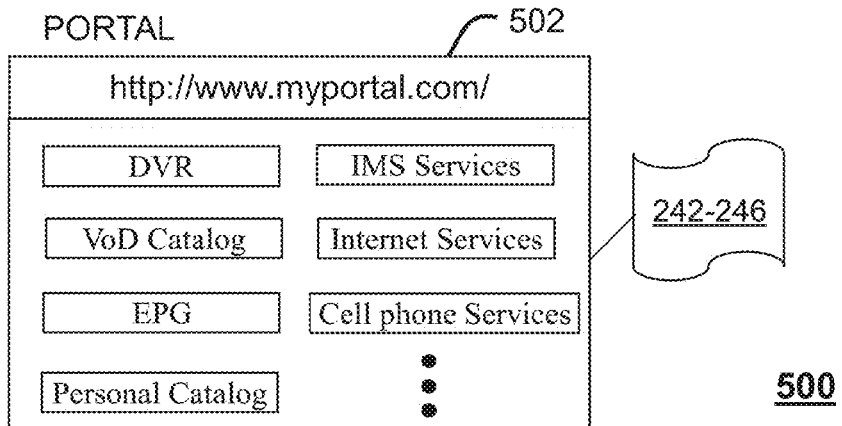
FIG. 5 depicts an illustrative embodiment of a web portal for interacting with the communication systems of FIGS. 1 and 2.

FIG. 5 depicts an illustrative embodiment of a web portal 502 of a communication of the communication systems 100, 200 of FIGS. 1 and/or 2. The web portal 502 can be used for managing services of systems 100, 200 of FIGS. 1 and/or 2. In at least some embodiments, the web portal 502 can be used for managing services of the wireless communication devices 110, 210 of systems 100, 200 of FIGS. 1 and/or 2. A web page of the web portal 502 can be accessed by a Uniform Resource Locator (URL) with an Internet browser using an Internet-capable communication device such as those described in FIGS. 1 and/or 2. The web portal 502 can be configured, for example, to access a media processor selective paging application server 118 and services managed thereby such as a content delivery services, e.g., including software updates, data transfers, media access, and the like. The web portal 502 can also be used for provisioning M2M services, provisioning Internet services, provisioning wireless services, and so on.

The web portal 502 can further be utilized to manage and provision software applications 242-246 to adapt these applications as may be desired by subscribers and/or service providers of the systems 100, 200 of FIGS. 1 and/or 2. For instance, users of the services provided by the selective paging application server 118, 218 and/or server 140, 240 can log into their on-line accounts and provision one or more of the servers 118, 218, 140, 230 with a feature that a user may want to program such. For example, data transfer entities, such as device manufacturers, maintainers, and the like can use the web portal 502 to enter or otherwise modify requests for selective IoT paging broadcasts. Information can be entered in various manners, such as providing inputs to fields of a form, such as requestor identity or account, authorization information, indicia of a group or class of devices targeted by the broadcast paging message, a target area, such as a geographical region, data content and/or pointers or references to data content to be provided to the UEs 110, 210. At least some of the information can be provided by user profiles that can be created, reviewed, modified, and so on by the web portal 502. Alternatively or in addition, service providers can use the web portal 502 to log onto an administrator account to provision, monitor and/or maintain the systems 100, 200 of FIGS. 1 and/or 2.

Figure 6:
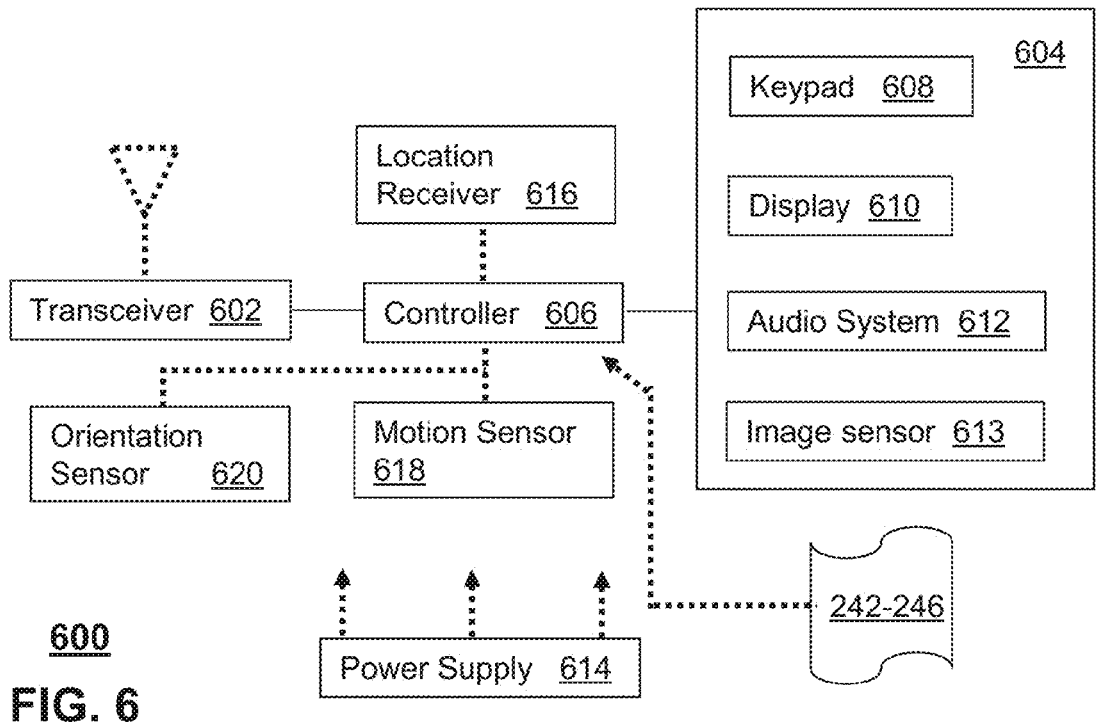
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIGS. 1 and/or 2 and can be configured to perform portions of processes 300, 400 of FIGS. 3 and/or 4.

The communication device 600 can include a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 700 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600) can be adapted to perform the functions of devices 110, 210 of FIGS. 1 and/or 2. It will be appreciated that the communication device 600 can also represent other devices that can operate in systems 100, 200 of FIGS. 1 and/or 2, such as a gaming console and a media player. In addition, the controller 606 can be adapted in various embodiments to perform one or more of the functions 242-246, respectively.

Upon reviewing the aforementioned embodiments, it would be evident to an artisan with ordinary skill in the art that said embodiments can be modified, reduced, or enhanced without departing from the scope of the claims described below. For example, the data transfer entity can be a wireless mobile device, wherein the downlink data and/or a related request can be transported over wireless mobility network to the selective paging application server 118 and/or the other server 140. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
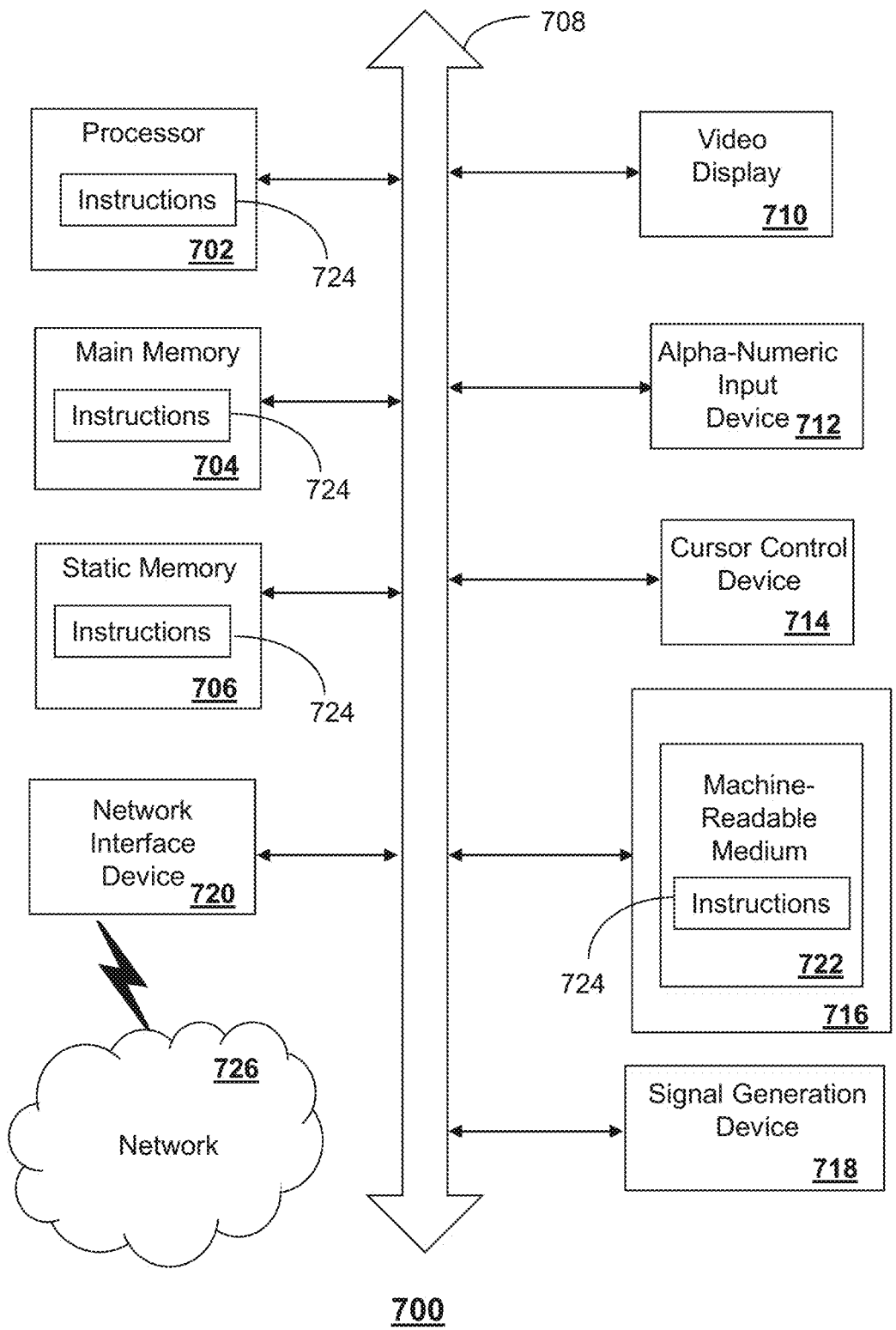
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the selective paging application server 118, 218, the RAN cell-site database 120, 220, the base transceiver stations 106, 206, the wireless communication devices, 110, 210, the server 140, 240, the BMSC 122, 222, the MBMS-GW 124, 224, and any of the network nodes, such as the MME 226, the SGW 230, the PGW or equipment of the content data network 234 and other devices of FIGS. 1-2. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA. LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   detecting, by a processing system comprising a processor, a data transfer request to wirelessly transfer data to a class of wireless communication devices;
   determining, by the processing system, a geographical region associated with the data transfer request;
   responsive to the data transfer request and based on the geographical region, identifying, by the processing system, a plurality of wireless base stations of a wireless mobility network that provide wireless communication services within the geographical region, wherein the wireless communication services comprise a Multimedia Broadcast Multicast Service (MBMS) service and a unicast service;
   determining, by the processing system, a number of wireless communication devices in the class of wireless communication devices;
   identifying the wireless communication devices in the class of wireless communication devices, wherein the wireless communication devices are located in the geographical region and accordingly are served by the plurality of wireless base stations;
   selecting, by the processing system and based at least in part on the determining the number of wireless communication devices, one of the MBMS service and the unicast service to transfer the data; and
   in accordance with a selection of the MBMS service, facilitating, by the processing system, a wireless transmission of a broadcast message by the plurality of wireless base stations to the class of wireless communication devices, wherein the broadcast message identifies the class of wireless communication devices, wherein the broadcast message is transmitted by way of the MBMS service, wherein the broadcast message initiates a state transition to an active state for wireless communication devices of the class of wireless communication devices configured in an idle state at a time of the wireless transmission of the broadcast message, and wherein the wireless communication devices receive the data without responding to the broadcast message.

2. The method of claim 1, wherein the broadcast message is transmitted by the plurality of wireless base stations on a broadcast channel of the wireless mobility network, wherein a plurality of wireless communication devices comprising the class of wireless communication devices, monitor the broadcast channel while in the idle state and while in the active state.

3. The method of claim 2, wherein devices of the class of wireless communication devices are distinguishable by attributes selected from the group consisting of a manufacturer, a service provider, a functionality, an application, and combinations thereof.

4. The method of claim 2, wherein the wireless communication device transitions to the active state without requiring an uplink message from the wireless communications device, wherein a first wireless communication device of the class of wireless communication devices transitions to the active state after a delay period and wherein a second wireless communication device of the class of wireless communication devices transitions after a different delay period.

5. The method of claim 1, further comprising:
   examining, by the processing system, a state of the wireless mobility network, wherein the selecting is based on one of the state of the wireless mobility network, the geographical region, the class of wireless communications devices, or a combination thereof.

6. The method of claim 1, wherein the wireless transmission of the broadcast message by the plurality of wireless base stations is repeated according to a schedule, and wherein a wireless communication device of the class of wireless communication devices located outside the geographical region during the wireless transmission receives the broadcast message upon returning to the geographical region.

7. The method of claim 1, wherein the detecting of the data transfer request to wirelessly transfer data to a class of wireless communication devices comprises receiving, by the processing system, downlink data directed to the class of wireless communication devices.

8. The method of claim 1, wherein the identifying of the plurality of wireless base stations comprises identifying, by the system, the plurality of wireless base stations of the wireless mobility network that provide wireless services to service areas within the geographical region.

9. A device, comprising:
   a processing system including a processor; and
   a memory that stores executable instructions that, when executed by the processing system, facilitate performance of operations, comprising:
   identifying a request to transfer pending data to a class of wireless communication devices within a geographical region;
   identifying a plurality of wireless base stations of a wireless mobility network, responsive to the request, wherein the plurality of wireless base stations provide wireless communication services comprising a Multimedia Broadcast Multicast Service (MBMS) service and a unicast service within the geographical region;

determining a number of wireless communication devices in the class of wireless communication devices;

identifying the wireless communication devices in the class of wireless communication devices, wherein the wireless communication devices are located in the geographical region and accordingly are served by the plurality of wireless base stations;

based at least in part on the determining, selecting the MBMS service, from among the wireless communication services, to transfer the pending data; and in accordance with a selection of the MBMS service, facilitating a wireless transmission of a first broadcast message by the plurality of wireless base stations to the class of wireless communication devices, wherein the first broadcast message identifies the class of wireless communication devices, wherein the broadcast message is transmitted by way of the MBMS service of the wireless communication services, wherein the first broadcast message initiates a state transition to an active state for a plurality of wireless communication devices of the class of wireless communication devices configured in an idle state, and wherein the wireless communication devices receive the pending data without responding to the first broadcast message.

10. The device of claim 9, wherein the operations further comprise:

examining a state of the wireless mobility network, wherein the selecting is based on one of the state of the wireless mobility network, the geographical region, the class of wireless communications devices, or a combination thereof.

11. The device of claim 9, wherein the first broadcast message provides a notification of a second broadcast message that provides the pending data, wherein the plurality of wireless communication devices of the class prepare to receive the pending data by way of the second broadcast message.

12. The device of claim 9, wherein the identifying of the request to transfer the pending data to a class of wireless communication devices comprises receiving the pending data directed to the class of wireless communication devices.

13. The device of claim 9, wherein the identifying of the plurality of wireless base stations comprises identifying the plurality of wireless base stations of the wireless mobility network that provide wireless services to service areas within the geographical region.

14. The device of claim 9, wherein the wireless transmission of the broadcast message by the plurality of wireless base stations is repeated according to a schedule, and wherein the state transition to the active state for the plurality of wireless communication devices comprises a plurality of delays.

15. The device of claim 9, wherein the wireless communication device transitions to the active state without requiring uplink messages from the wireless communications device, wherein the wireless communication device receives the pending data when configured in the active state.

16. A non-transitory machine-readable storage medium, comprising executable instructions that, when executed by a processing system including a processor, facilitate performance of operations, comprising:

determining a request to transfer data to a group of wireless communication devices within an area;

determining a plurality of wireless base stations of a wireless mobility network, responsive to the request, wherein the plurality of wireless base stations provide wireless communication services comprising a Multimedia Broadcast Multicast Service (MBMS) service and a unicast service within the area;

determining a number of wireless communication devices in the group of wireless communication devices;

identifying the wireless communication devices in the group of wireless communication devices, wherein the wireless communication devices are located in the area and accordingly are served by the plurality of wireless base stations;

selecting, based at least in part on the determining of the number of wireless communication devices, one of the MBMS service and the unicast service to transfer the data; and in accordance with a selection of the MBMS service, facilitating a wireless transmission of a first broadcast message by the plurality of wireless base stations to the group of wireless communication devices, wherein the first broadcast message identifies the group of wireless communication devices, wherein the first broadcast message is transmitted by way of the MBMS service of the wireless communication services, wherein the first broadcast message initiates a state transition to an active state for a plurality of wireless communication devices of the group of wireless communication devices configured in an idle state, and wherein the wireless communication devices receive the data without responding to the first broadcast message.

17. The non-transitory machine-readable storage medium of claim 16, wherein the determining of the request to transfer data to a group of wireless communication devices comprises receiving downlink data directed to the group of wireless communication devices, and wherein the state transition to the active state for a wireless communication device of the plurality of wireless communication devices occurs after a configurable time delay.

18. The non-transitory machine-readable storage medium of claim 16, wherein the determining of the area identified in the request, and wherein the determining of the plurality of wireless base stations comprises identifying the plurality of wireless base stations of the wireless mobility network that provide wireless services to service areas within the area.

19. The non-transitory machine-readable storage medium of claim 16, wherein the wireless transmission of the broadcast message by the plurality of wireless base stations is repeated according to a schedule.

20. The non-transitory machine-readable storage medium of claim 16, wherein the wireless communication device transitions to the active state without requiring uplink messages from the wireless communications device, wherein the wireless communication device receives the data when configured in the active state.

* * * * *

UNITED STATES PATENT AND TRADEMARK OFFICE
CERTIFICATE OF CORRECTION

PATENT NO. : 9,913,249 B2
APPLICATION NO. : 14/963468
DATED : March 6, 2018
INVENTOR(S) : Gaurav Gupta, Rajendra Prasad Kodaypak and Vivek Mhatre Page 1 of 1

It is certified that error appears in the above-identified patent and that said Letters Patent is hereby corrected as shown below:

(74) Attorney, Agent, or Firm - should read:
Guntin & Gust, PLC; Jay Anderson

Signed and Sealed this
First Day of May, 2018

Andrei Iancu
*Director of the United States Patent and Trademark Office*